US010507732B2

(12) United States Patent
Uchida

(10) Patent No.: US 10,507,732 B2
(45) Date of Patent: Dec. 17, 2019

(54) CHARGING APPARATUS

(71) Applicant: KABUSHIKI KAISHA TOYOTA JIDOSHOKKI, Kariya-shi, Aichi (JP)

(72) Inventor: Kei Uchida, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 81 days.

(21) Appl. No.: 15/521,384

(22) PCT Filed: Oct. 13, 2015

(86) PCT No.: PCT/JP2015/078971
§ 371 (c)(1),
(2) Date: Apr. 24, 2017

(87) PCT Pub. No.: WO2016/067913
PCT Pub. Date: May 6, 2016

(65) Prior Publication Data
US 2017/0305279 A1    Oct. 26, 2017

(30) Foreign Application Priority Data

Oct. 29, 2014 (JP) .................................. 2014-219998

(51) Int. Cl.
*H02J 7/00* (2006.01)
*B60L 11/18* (2006.01)
(Continued)

(52) U.S. Cl.
CPC ............... *B60L 11/18* (2013.01); *B60L 50/50* (2019.02); *B60L 53/00* (2019.02); *B60L 53/60* (2019.02);
(Continued)

(58) Field of Classification Search
USPC .......................................................... 320/109
See application file for complete search history.

(56) References Cited

U.S. PATENT DOCUMENTS

2009/0146610 A1* 6/2009 Trigiani ................ H02J 7/0018
320/119
2010/0007311 A1    1/2010 Colin et al.
(Continued)

FOREIGN PATENT DOCUMENTS

| CN | 102244407 A | 11/2011 |
|---|---|---|
| JP | 2010-518566 A | 5/2010 |

(Continued)

OTHER PUBLICATIONS

International Search Report of PCT/JP2015/078971 dated Dec. 28, 2015.

*Primary Examiner* — Samuel Berhanu
(74) *Attorney, Agent, or Firm* — Sughrue Mion, PLLC

(57) ABSTRACT

A charging apparatus 1 includes one or more chargers 2, wherein the chargers 2 each include a communication control unit 24 that is capable of communicating with a vehicle-mounted communication unit 5 or another charger 2, and, according to an output-power command value C1 transmitted from the vehicle-mounted communication unit 5 or an output-power command value C2 transmitted from the other charger 2, the communication control unit 24 sets an output-power command value C3 for a charger 2 associated therewith, and transmits the output-power command value C1 or C2 to the other charger 2 when the other charger 2 has been connected.

4 Claims, 5 Drawing Sheets

(51) Int. Cl.
    *H02J 7/04*           (2006.01)
    *H01M 10/42*        (2006.01)
    *H01M 10/48*        (2006.01)
    *B60L 50/50*         (2019.01)
    *B60L 53/00*         (2019.01)
    *B60L 53/60*         (2019.01)
    *B60L 53/63*         (2019.01)
    *H01M 10/052*      (2010.01)
    *H02J 13/00*        (2006.01)

(52) U.S. Cl.
    CPC ......... *B60L 53/63* (2019.02); *H01M 10/4207* (2013.01); *H01M 10/482* (2013.01); *H02J 7/00* (2013.01); *H02J 7/0052* (2013.01); *H02J 7/04* (2013.01); *H01M 10/052* (2013.01); *H02J 13/0024* (2013.01); *Y02T 10/7005* (2013.01); *Y02T 10/7072* (2013.01); *Y02T 90/14* (2013.01); *Y02T 90/16* (2013.01)

(56) References Cited

U.S. PATENT DOCUMENTS

2011/0304298 A1\* 12/2011 Gow .................. H02J 1/10
                                                                  320/107
2012/0126743 A1     5/2012   Rivers, Jr. et al.
2012/0181983 A1     7/2012   Khan et al.

FOREIGN PATENT DOCUMENTS

| | | |
|---|---|---|
| JP | 2012-143083 A | 7/2012 |
| JP | 2013-090565 A | 5/2013 |
| WO | 2008/101788 A1 | 8/2008 |
| WO | 2011/143158 A2 | 11/2011 |

\* cited by examiner

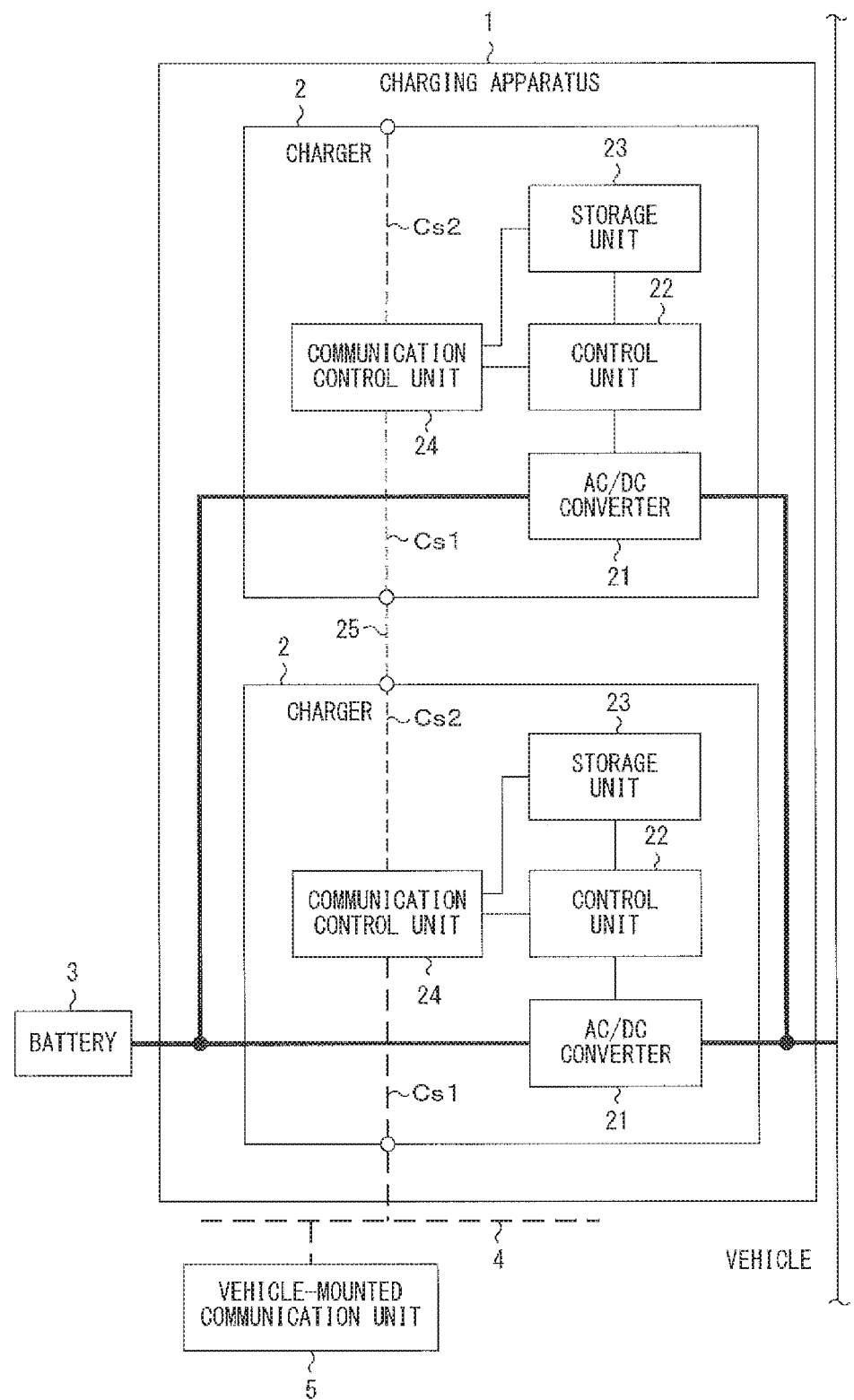
F I G 1

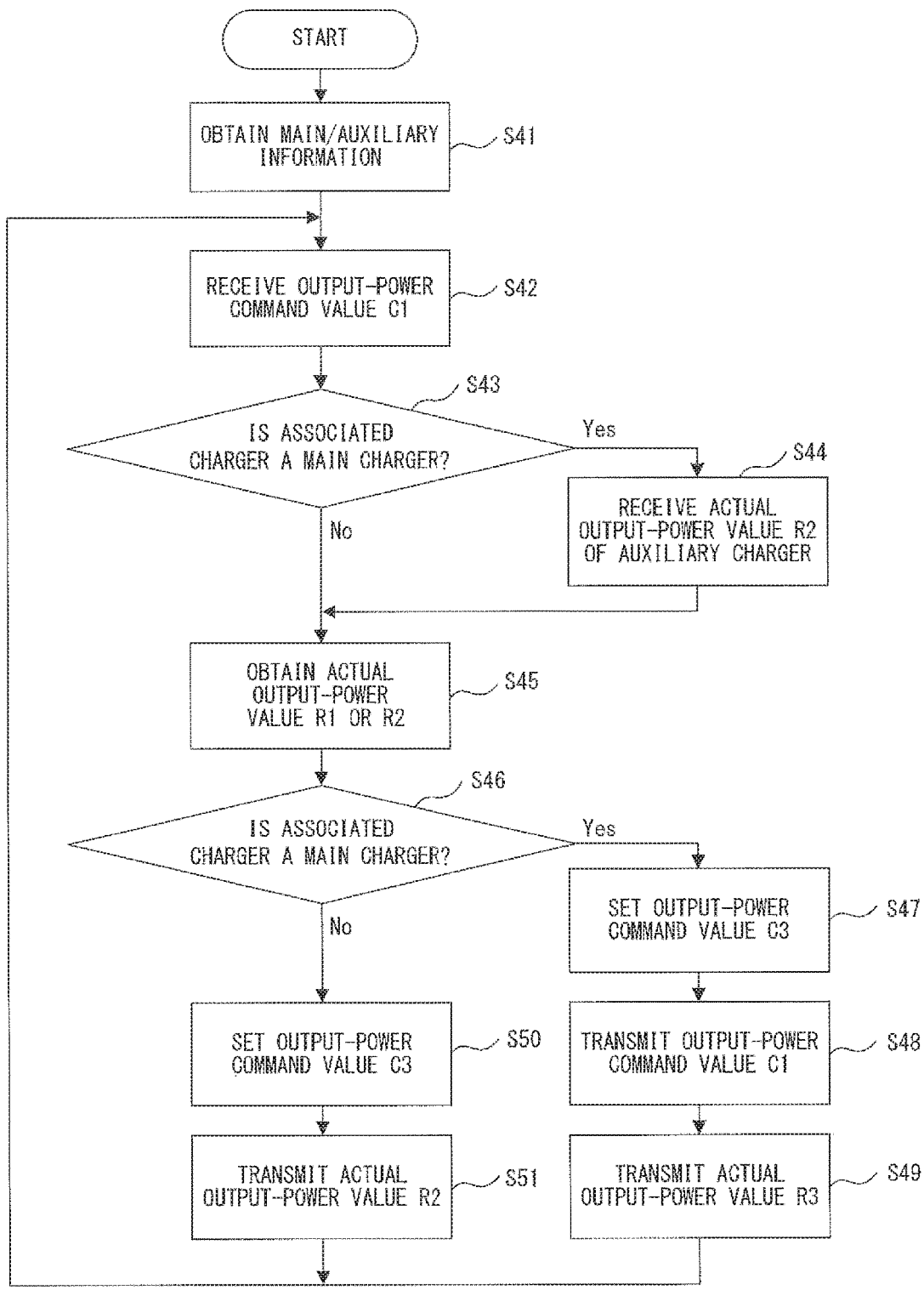
F I G. 4

CHARGING APPARATUS

CROSS REFERENCE TO RELATED APPLICATIONS

This application is a National Stage of International Application No. PCT/JP2015/078971 filed Oct. 13, 2015, claiming priority based on Japanese Patent Application No. 2014-219998 filed Oct. 29, 2014, the contents of all of which are incorporated herein by reference in their entirety.

TECHNICAL FIELD

The present invention relates to a charging apparatus to be installed in a vehicle.

BACKGROUND ART

With the spread of vehicles such as electric vehicles and plug-in hybrid cars, attempts have been made to improve techniques related to charging apparatuses for charging batteries of a vehicle. See, for example, patent documents 1-3.

However, when charging apparatuses need to provide different output power for each battery or vehicle type, a charging apparatus needs to be developed for each type of required output power. This increases the development cost for each individual charging apparatus, and hence the advantages of cost reduction obtained by mass production cannot be strongly expected.

PRIOR ART DOCUMENTS

Patent Documents

Patent document 1: Japanese Laid-open Patent Publication No. 2013-090565
Patent document 2: Japanese National Publication of International Patent Application No. 2010-518566
Patent document 3: Japanese Laid-open Patent Publication No. 2012-143083

SUMMARY OF INVENTION

Technical Problem

An object of the present invention is to provide a charging apparatus such that, even when charging apparatuses need to provide different output power for each battery or vehicle type, the development cost for each individual charging apparatus can be decreased by eliminating the need to develop a charging apparatus for each type of required output power, thereby leading to cost reduction.

Solution to Problem

A charging apparatus in accordance with an embodiment is installed in a vehicle and includes one or more chargers.

The charger includes a communication control unit that is capable of communicating with a vehicle-mounted communication unit or another charger.

According to a first output-power command value transmitted from the vehicle-mounted communication unit or a second output-power command value transmitted from the other charger, the communication control unit sets, as an output-power command value for a charger associated therewith, a third output-power command value, and transmits the first or second output-power command value to the other charger when the other charger has been connected.

As a result, the chargers can cooperate so as to set the output power of the charging apparatus to a required output power. This can eliminate the need to develop a charging apparatus for each type of required output power, so that the development cost for each individual charging apparatus can be decreased, thereby leading to cost reduction.

Advantageous Effects of Invention

The present invention enables cost reduction even when charging apparatuses installed in a vehicle need to provide different required output power for each battery or vehicle type.

BRIEF DESCRIPTION OF DRAWINGS

FIG. 1 illustrates a charging apparatus in accordance with an embodiment;
FIG. 4 is a flowchart illustrating another exemplary operation of a communication control unit.

DESCRIPTION OF EMBODIMENTS

Figure 2:
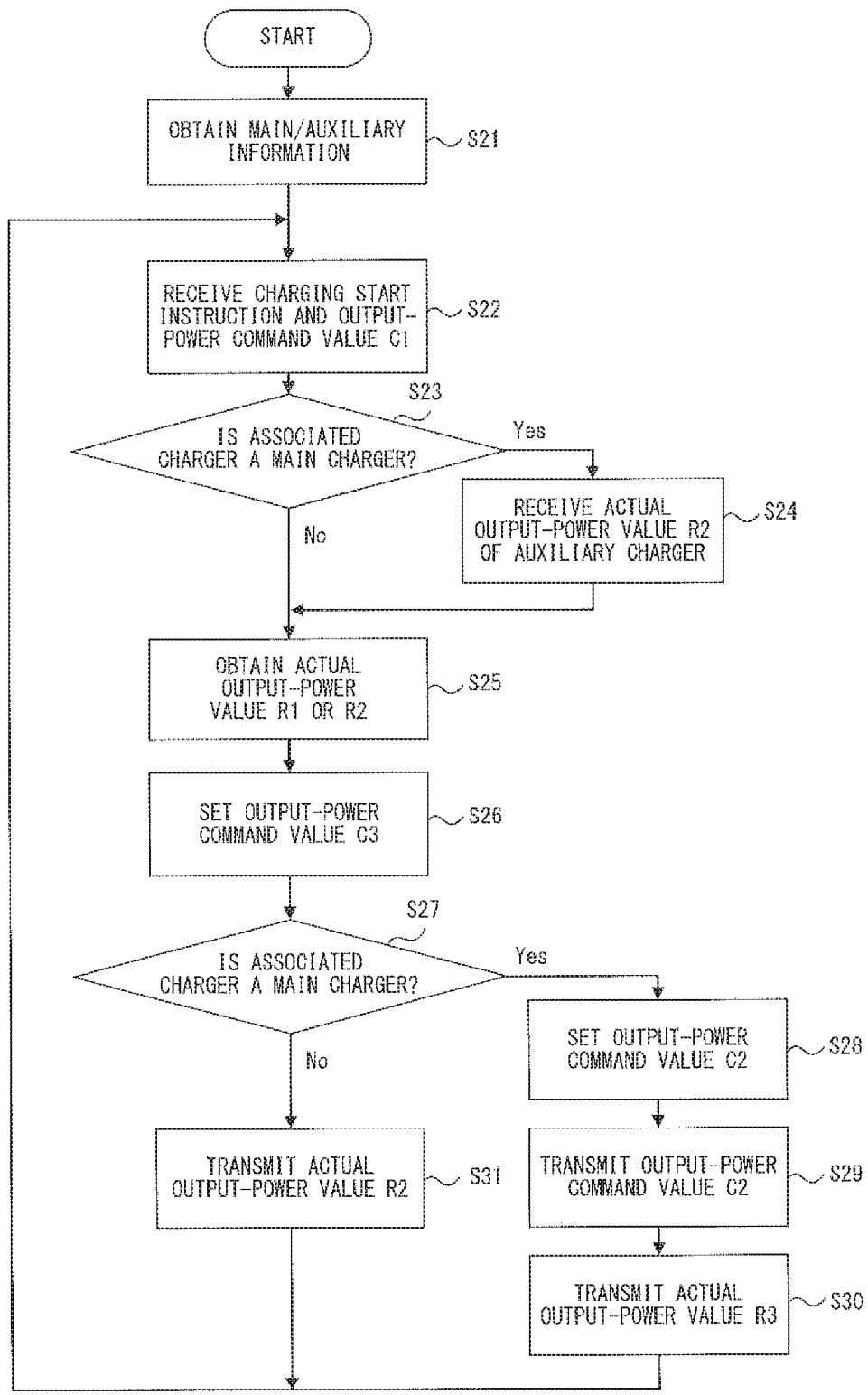
FIG. 2 is a flowchart illustrating an exemplary operation of a communication control unit.

FIG. 1 illustrates a charging apparatus in accordance with an embodiment.

A charging apparatus 1 depicted in FIG. 1 is installed in a vehicle such as an electric vehicle or a plug-in hybrid car, and includes two chargers 2. The chargers 2 each output power for charging a battery 3 using power supplied from a charging stand outside the vehicle. The chargers 2 are connected in parallel to each other so as to combine power output from the chargers 2, and the combined power is supplied to the battery 3 as output power of the charging apparatus 1. When, for example, the charging apparatus 1 needs to provide output power of 6.0 [kW] with each of the chargers 2 having rated power of 3.0 [kW], the charging apparatus 1 includes two chargers 2, as depicted in FIG. 1.

The charger 2 includes an AC/DC converter 21, a control unit 22, a storage unit 23, and a communication control unit 24. The control unit 22 and the communication control unit 24 may be formed as one control unit. The control unit 22 and the communication control unit 24 include, for example, a CPU (Central Processing Unit), a multi-core CPU, a programmable device (FPGA (Field Programmable Gate Array), and a PLD (Programmable Logic Device). The storage unit 23 includes, for example, a RAM (Random Access Memory) and a ROM (Read Only Memory).

The AC/DC converter 21 converts AC power input via an input terminal ACin (e.g., power supplied from a charging stand outside the vehicle) into DC power, and outputs the DC power via an output terminal DCout. The AC/DC converter 21 may be replaced with a DC/DC converter.

The control unit 22 controls operations of the AC/DC converter 21 according to data stored in the storage unit 23 or data transmitted from the communication control unit 24.

The communication control unit 24 includes two communication systems Cs1 and Cs2. When the communication control unit 24 has been connected to a network 4 (e.g., CAN (Controller Area Network)) by the communication system Cs1, the communication control unit 24 becomes capable of communicating with a vehicle-mounted communication unit 5 that controls, for example, vehicle travel. When the communication control unit 24 has been connected, by the communication system Cs2, to the communication system CS1 of another charger 2 via a communication line 25, the communication control unit 24 becomes capable of communicating with the other charger 2. The communication control unit 24 also has a function for allowing the chargers 2 to cooperate to output power that the charging apparatus 1 needs to provide.

FIG. 2 is a flowchart illustrating an exemplary operation of the communication control unit 24 that demonstrates a function for allowing the chargers 2 to cooperate to output power that the charging apparatus 1 needs to provide.

The communication control unit 24 obtains, from the storage unit 23, main/auxiliary information for determining whether the charger 2 associated with the communication control unit 24 is a main charger or whether it is an auxiliary charger (S21), and receives a charging start instruction transmitted from the vehicle-mounted communication unit 5, and an output-power command value C1 (first output-power command value) of the charging apparatus 1 that indicates output power that the charging apparatus 1 needs to provide (S22).

When the communication control unit 24 has determined that the charger 2 associated therewith is a main charger according to the main/auxiliary information obtained in S21 (S23: Yes), the communication control unit 24 receives an actual output-power value R2 of an auxiliary charger that is transmitted from another charger 2, i.e., the auxiliary charger (S24), and obtains an actual output-power value R1 of the main charger (S25). Note that main/auxiliary information is stored in the storage unit 23 of each of the chargers 2 in advance in a manner such that a charger 2 capable of communicating with the vehicle-mounted communication unit 5 serves as a main charger.

When the communication control unit 24 has determined that the charger 2 associated therewith is an auxiliary charger according to the main/auxiliary information obtained in S21 (S23: No), the communication control unit 24 obtains an actual output-power value R2 of the auxiliary charger (S25).

The communication control unit 24 sets an output-power command value C3 (third output-power command value) for the charger 2 associated therewith (S26), and determines again whether the charger 2 associated therewith is a main charger (S27).

When the communication control unit 24 has determined that the charger 2 associated therewith is a main charger (S27: Yes), the communication control unit 24 sets an output-power command value C2 for the auxiliary charger (second output-power command value) (S28), transmits the output-power command value C2 to the auxiliary charger (S29), and transmits an actual output-power value R3 of the charging apparatus 1 to the vehicle-mounted communication unit 5 (S30).

When the communication control unit 24 has determined that the charger 2 associated therewith is an auxiliary charger (S27: No), the communication control unit 24 transmits the actual output-power value R2 of the auxiliary charger to the main charger (S31).

The processes of S22-S31 are repeated until the charging process for the battery 3 has been finished.

Figure 3:
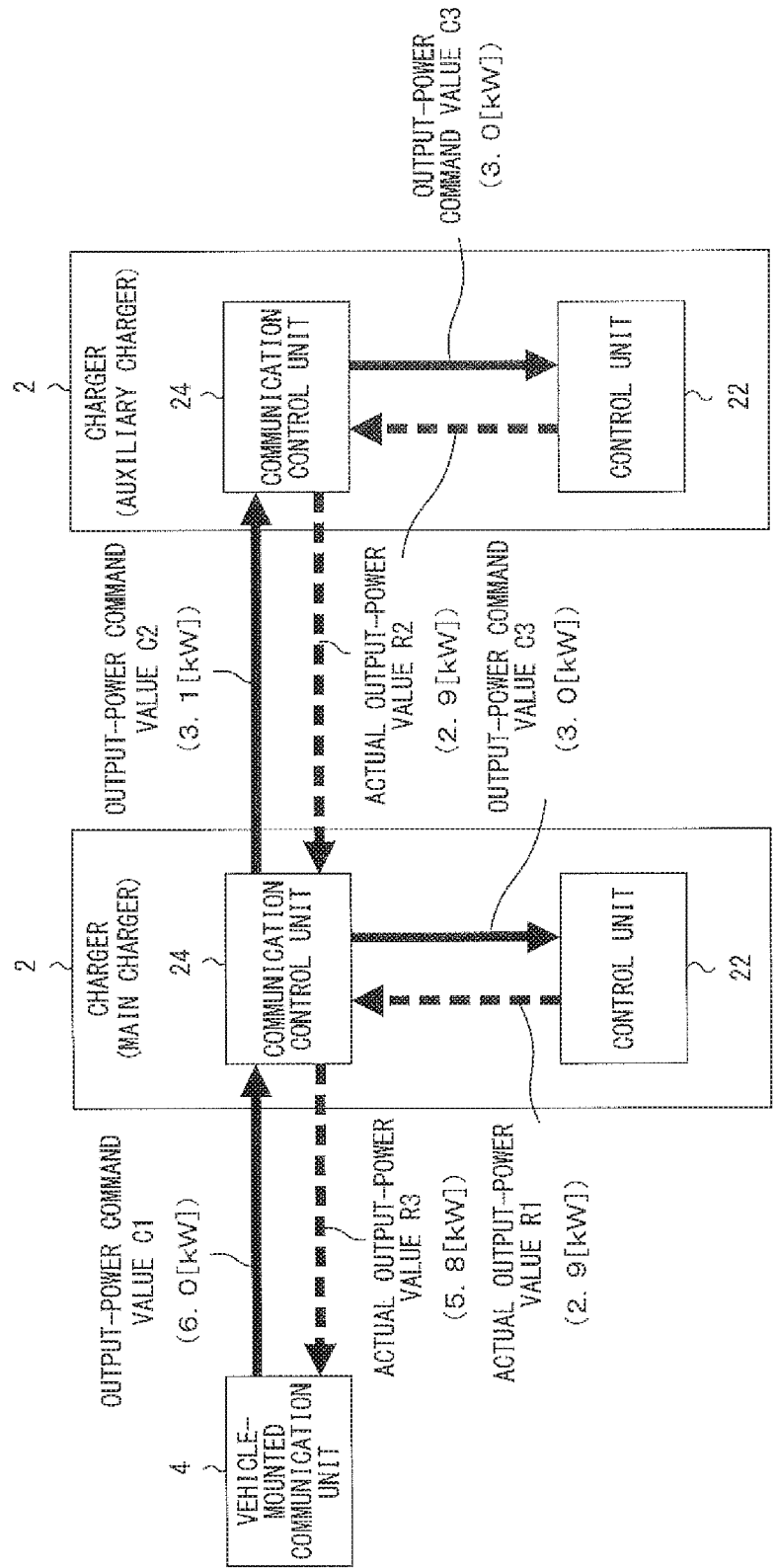
FIG. 3 illustrates examples of data transmitted and received between a charger and a vehicle-mounted communication unit in the exemplary operation depicted in FIG. 2.

FIG. 3 illustrates examples of data transmitted and received between the charger 2 and the vehicle-mounted communication unit 5 in the exemplary operation depicted in FIG. 2.

When the charging apparatus 1 has been activated, or when the communication control units 24 of the individual chargers 2 have determined that the vehicle and a charging stand have been connected via a charging cable, the communication control units 24 each obtain main/auxiliary information from the storage unit 23 and determine whether the charger 2 associated therewith is a main charger or whether it is an auxiliary charger.

Upon receipt of a charging start instruction transmitted from the vehicle-mounted communication unit 5 and an output-power command value C1 of the charging apparatus 1 (6.0 [kW]), the communication control unit 24 of the main charger sets the smaller of the output-power command value C1 of the charging apparatus 1 (6.0 [kW]) and the rated power value of the main charger obtained from the storage unit 23 (3.0 [kW]), i.e., 3.0 [kW], as an output-power command value C3 for the main charger, and transmits the output-power command value C3 to the control unit 22 of the main charger.

According to the output-power command value C3 of the main charger (3.0 [kW]), the control unit 22 of the main charger controls operations of the AC/DC converter 21 of the main charger, multiplies a voltage detected by a voltage detecting unit provided in an output stage of the AC/DC converter 21 of the main charger by a current detected by a current detecting unit provided in an output stage of the AC/DC converter 21 of the main charger, and transmits the product of 2.9 [kW] to the communication control unit 24 of the main charger as an actual output-power value R1 of the main charger.

The communication control unit 24 of the main charger subtracts the actual output-power value R1 of the main charger (2.9 [kW]) from the output-power command value of the charging apparatus 1 (6.0 [kW]), and transmits the difference of 3.1 [kW] to the auxiliary charger as an output-power command value C2 for the auxiliary charger.

Upon receipt of the output-power command value C2 of the auxiliary charger (3.1 [kW]), the communication control unit 24 of the auxiliary charger sets the smaller of the output-power command value C2 of the auxiliary charger (3.1 [kW]) and the rated power value of the auxiliary charger obtained from the storage unit 23 (3.0 [kW]), i.e., 3.0 [kW], as an output-power command value C3 for the auxiliary charger, and transmits the rated power value to the control unit 22 of the auxiliary charger.

According to the output-power command value C3 of the auxiliary charger (3.0 [kW]), the control unit 22 of the auxiliary charger controls operations of the AC/DC converter 21 of the auxiliary charger, multiplies a voltage detected by a voltage detecting unit provided in an output stage of the AC/DC converter 21 of the auxiliary charger by a current detected by a current detecting unit provided in an output stage of the AC/DC converter 21 of the auxiliary charger, and transmits the product of 2.9 [kW] to the communication control unit 24 of the auxiliary charger as an actual output-power value R2 of the auxiliary charger.

The communication control unit 24 of the auxiliary charger transmits the actual output-power value R2 of the auxiliary charger (2.9 [kW]) to the main charger.

Upon receipt of the actual output-power value R2 of the auxiliary charger (2.9 [kW]), the communication control unit 24 of the main charger adds the actual output-power value R1 of the main charger (2.9 [kW]) to the actual output-power value R2 of the auxiliary charger (2.9 [kW]), and transmits the sum of 5.8 [kW] to the vehicle-mounted communication unit 5 as an actual output-power value R3 of the charging apparatus 1.

As described above, in the exemplary operation depicted in FIG. 2, each of the chargers 2 determines whether the charger 2 is a main charger or whether it is an auxiliary charger; then, according to the output-power command value C1 of the charging apparatus 1, the communication control unit 24 of the main charger sets an output-power command value C3 for the main charger and an output-power command value C2 for the auxiliary charger; the communication control unit 24 of the auxiliary charger sets an output-power command value C3 for the auxiliary charger according to the output-power command value C2 of the auxiliary charger. That is, the main charger sets an output-power command value C2 such that the auxiliary charger compensates for the portions of the output-power command value C1 that exclude the output-power command value C3 of the main charger. This allows the main charger and the auxiliary charger to cooperate to output an actual output-power value R3 that depends on the output-power command value C1.

FIG. 4 is a flowchart illustrating another exemplary operation of the communication control unit 24 that demonstrates a function for allowing the chargers 2 to cooperate to output power that the charging apparatus 1 needs to provide.

The communication control unit 24 obtains, from the storage unit 23, main/auxiliary information for determining whether the charger 2 associated with the communication control unit 24 is a main charger or whether it is an auxiliary charger (S41), and receives a charging start instruction transmitted from the vehicle-mounted communication unit 5, and an output-power command value C1 of the charging apparatus 1 (S42).

When the communication control unit 24 has determined that the charger 2 associated therewith is a main charger according to the main/auxiliary information obtained in S41 (S43: Yes), the communication control unit 24 receives an actual output-power value R2 of an auxiliary charger that is transmitted from the auxiliary charger (S44), and obtains an actual output-power value R1 of the main charger (S45).

When the communication control unit 24 has determined that the charger 2 associated therewith is an auxiliary charger according to the main/auxiliary information obtained in S41 (S43: No), the communication control unit 24 obtains an actual output-power value R2 of the auxiliary charger (S45).

When the communication control unit 24 has determined that the charger 2 associated therewith is a main charger (S46: Yes), the communication control unit 24 sets an output-power command value C3 for the main charger (S47), transmits the output-power command value C1 of the charging apparatus 1 to the auxiliary charger (S48), and transmits an actual output-power value R3 of the charging apparatus 1 to the vehicle-mounted communication unit 5 (S49).

When the communication control unit 24 has determined that the charger 2 associated therewith is an auxiliary charger (S46: No), the communication control unit 24 sets an output-power command value C3 for the auxiliary charger (S50), and transmits the actual output-power value R2 of the auxiliary charger to the main charger (S51).

The processes of S42-S51 are repeated until the charging process for the battery 3 has been finished.

Figure 5:
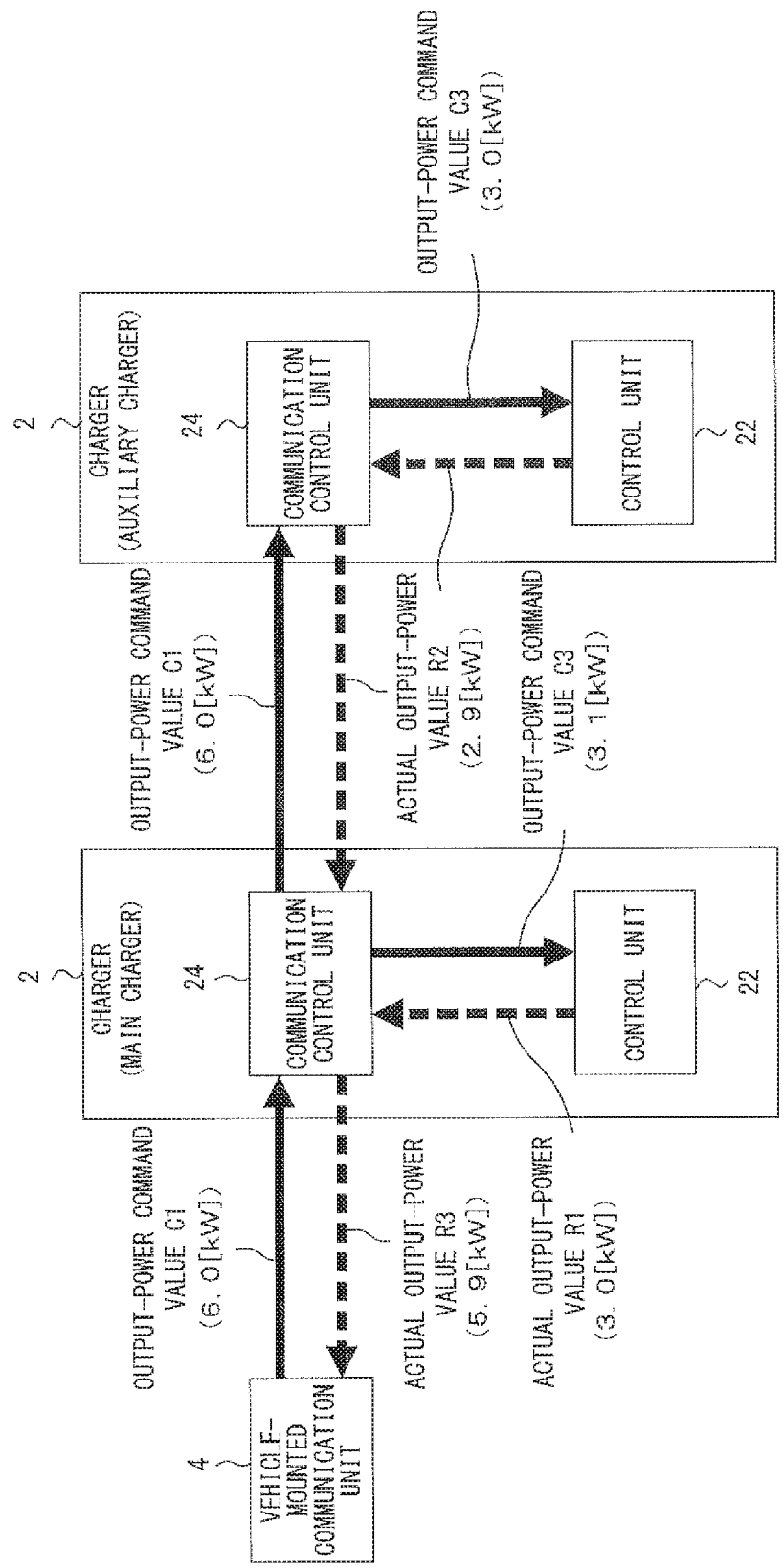
FIG. 5 illustrates examples of data transmitted and received between a charger and a vehicle-mounted communication unit in the exemplary operation depicted in FIG. 4.

FIG. 5 illustrates examples of data transmitted and received between the charger 2 and the vehicle-mounted communication unit 5 in the exemplary operation depicted in FIG. 4.

When the charging apparatus 1 has been activated, or when the communication control units 24 of the individual chargers 2 have determined that the vehicle and a charging stand has been connected via a charging cable, the communication control units 24 each obtain main/auxiliary information from the storage unit 23 and determine whether the charger 2 associated therewith is a main charger or whether it is an auxiliary charger.

Upon receipt of a charging start instruction transmitted from the vehicle-mounted communication unit 5 and an output-power command value C1 of the charging apparatus 1 (6.0 [kW]), the communication control unit 24 of the main charger transmits the output-power command value C1 of the charging apparatus 1 (6.0 [kW]) to the communication control unit 24 of the auxiliary charger.

Upon receipt of the output-power command value C1 of the charging apparatus 1 (6.0 [kW]), the communication control unit 24 of the auxiliary charger sets the smaller of the output-power command value C1 of the charging apparatus 1 (6.0 [kW]) and the rated power value of the auxiliary charger obtained from the storage unit 23 (3.0 [kW]), i.e., 3.0 [kW], as an output-power command value C3 for the auxiliary charger, and transmits the output-power command value C3 to the control unit 22 of the auxiliary charger.

According to the output-power command value C3 of the auxiliary charger (3.0 [kW]), the control unit 22 of the auxiliary charger controls operations of the AC/DC converter 21 of the auxiliary charger, multiplies a voltage detected by a voltage detecting unit provided in an output stage of the AC/DC converter 21 of the auxiliary charger by a current detected by a current detecting unit provided in an output stage of the AC/DC converter 21 of the auxiliary charger, and transmits the product of 2.9 [kW] to the communication control unit 24 of the auxiliary charger as an actual output-power value R2 of the auxiliary charger.

The communication control unit 24 of the auxiliary charger transmits the actual output-power value R2 of the auxiliary charger (2.9 [kW]) to the main charger.

Upon receipt of the actual output-power value R2 of the auxiliary charger (2.9 [kW]), the communication control unit 24 of the main charger subtracts the actual output-power value R2 of the auxiliary charger (2.9 [kW]) from the output-power command value of the charging apparatus 1 (6.0 [kW]), and transmits the difference of 3.1 [kW] to the control unit 22 of the main charger as an output-power command value C3 for the main charger.

According to the output-power command value C3 of the main charger (3.1 [kW]), the control unit 22 of the main charger controls operations of the AC/DC converter 21 of the main charger, multiplies a voltage detected by a voltage detecting unit provided in an output stage of the AC/DC converter 21 of the main charger by a current detected by a current detecting unit provided in an output stage of the AC/DC converter 21 of the main charger, and transmits the product of 3.0 [kW] to the communication control unit 24 of the main charger as an actual output-power value R1 of the main charger.

The communication control unit 24 of the main charger adds the actual output-power value R1 of the main charger (3.0 [kW]) to the actual output-power value R2 of the auxiliary charger (2.9 [kW]), and transmits the sum of 5.9 [kW] to the vehicle-mounted communication unit 5 as an actual output-power value R3 of the charging apparatus 1.

As described above, in the exemplary operation depicted in FIG. 4, each of the chargers 2 determines whether the charger 2 is a main charger or whether it is an auxiliary charger; then, the communication control unit 24 of the auxiliary charger sets an output-power command value C3 for the auxiliary charger according to the output-power command value C1 of the charging apparatus 1; the communication control unit 24 of the main charger sets an output-power command value C3 for the main charger according to the output-power command value C1 of the charging apparatus 1 and the actual output-power value R2 of the auxiliary charger. That is, the main charger sets an output-power command value C3 therefor such that the difference between the output-power command value C1 and the actual output-power value R2 of the auxiliary charger is compensated for. As in the exemplary operation depicted in FIG. 2, this allows the main charger and the auxiliary charger to cooperate to output an actual output-power value R3 that depends on the output-power command value C1.

In the exemplary operations depicted in FIGS. 2 and 4, the vehicle-mounted communication unit 5 needs to set only an output-power command value C1 for the charging apparatus 1; hence, even though the charging apparatus 1 needs to provide different output power for each battery or vehicle type, an interface between the vehicle-mounted communication unit 5 and the charging apparatus 1 can be standardized.

In the exemplary operations depicted in FIGS. 2 and 4, the vehicle-mounted communication unit 5 does not need to set an output-power command value for each of the chargers 2, and hence the configuration of the vehicle-mounted communication unit 5 does not become complicated.

As described above, in the charging apparatus 1 in accordance with embodiments, the communication control unit 24 sets an output-power command value C3 for the charger 2 associated with the communication control unit 24 according to an output-power command value C1 transmitted from the vehicle-mounted communication unit 5 or an output-power command value C2 transmitted from another charger 2; when the other charger 2 has been connected, the communication control unit transmits the output-power command value C1 or the output-power command value C2 to the other charger 2. As a result, the chargers 2 can cooperate to set the output power of the charging apparatus 1 to a required output power. This can eliminate the need to develop a charging apparatus 1 for each type of required output power, so that the development cost for each individual charging apparatus can be decreased, thereby leading to cost reduction.

The charging apparatus 1 in accordance with embodiments enables mass production of chargers 2, thereby leading to further cost reduction.

In the embodiments described above, the main charger in the exemplary operation depicted in FIG. 2 is configured to subtract the actual output-power value R1 of the main charger from the output-power command value C1 of the charging apparatus 1, and to transmit the difference to the auxiliary charger as an output-power command value C2 for the auxiliary charger. However, the main charger may be configured to subtract the output-power command value C3 of the main charger from the output-power command value C1 of the charging apparatus 1, and to transmit the difference to the auxiliary charger as an output-power command value C2 for the auxiliary charger.

In the embodiments described above, the main charger in the exemplary operation depicted in FIG. 2 is configured to set the smaller of the output-power command value C1 and the rated power value of the main charger as an output-power command value C3 for the main charger. However, the main charger may be configured to set an output-power command value C3 for the main charger that does not exceed the rated power value of the main charger.

In the embodiments described above, the auxiliary charger in the exemplary operation depicted in FIG. 2 is configured to set the smaller of the output-power command value C2 and the rated power value of the auxiliary charger as an output-power command value C3 for the auxiliary charger. However, the auxiliary charger may be configured to set an output-power command value C3 for the auxiliary charger that does not exceed the rated power value of the auxiliary charger.

In the embodiments described above, the auxiliary charger in the exemplary operation depicted in FIG. 4 is configured to set the smaller of the output-power command value C1 and the rated power value of the auxiliary charger as an output-power command value C3 for the auxiliary charger. However, the auxiliary charger may be configured to set an output-power command value C3 for the auxiliary charger that does not exceed the rated power value of the auxiliary charger.

In the embodiments described above, the auxiliary charger in the exemplary operation depicted in FIG. 2 is configured to set the smaller of the output-power command value C2 and the rated power value of the auxiliary charger as an output-power command value C3 for the auxiliary charger. However, the auxiliary charger may be configured to set the output-power command value C2 of the auxiliary charger directly as an output-power command value C3 for the auxiliary charger.

In the embodiments described above, the charging apparatus 1 includes two chargers 2. However, the charging apparatus 1 may include one charger or three or more chargers.

When the charging apparatus 1 includes three or more chargers 2, each of the chargers 2 sets an output-power command value C2 such that the other chargers compensate for the portions of the output-power command value C1 that exclude the output-power command value C3 of the charger 2.

When the charging apparatus 1 includes three or more chargers 2, each of the chargers 2 sets an output-power command value C3 therefor such that the difference between the output-power command value C1 and the sum of the actual output-power values R2 of the other chargers 2 is compensated for. When, for example, the charging apparatus 1 includes one main charger and two auxiliary chargers, the main charger sets an output-power command value C3 therefor such that the difference between the output-power command value C1 and the sum of the actual output-power values R2 output from the two auxiliary chargers is compensated for.

EXPLANATION OF THE CODES

1 Charging apparatus
2 Charger
3 Battery
4 Network
5 Vehicle-mounted communication unit
21 AC/DC converter
22 Control unit
23 Storage unit
24 Communication control unit

The invention claimed is:

1. A charging apparatus to be installed in a vehicle, the charging apparatus comprising:

a main charger and an auxiliary charger, wherein the main charger includes a first communication control unit that is capable of communicating with a vehicle-mounted communication unit or the auxiliary charger, and the auxiliary charger includes a second communication control unit that is capable of communicating with the main charger, when the first communication control unit of the main charger has set a smaller of a first output-power command value transmitted from the vehicle-mounted communication unit and a rated power value of the main charger as an output-power command value for the main charger, the first communication control unit of the main charger transmits to the auxiliary charger a second output-power command value that is a difference between the first output-power command value and an actual output-power value of the main charger or the output-power command value of the main charger, when the first communication control unit of the main charger has set a difference between the first output-power command value and an actual output-power value of the auxiliary charger as the output-power command value for the main charger, the first communication control unit of the main charger transmits the first output-power command value to the auxiliary charger, and the second communication control unit of the auxiliary charger sets an output-power command value for the auxiliary charger according to the first or second output-power command value, and transmits the actual output-power value for the auxiliary charger to the main charger, so that the main charger provides the vehicle-mounted communication unit with an actual output power value of the charging apparatus, the main charger and the auxiliary charger supply power, which has a value corresponding to a combination of the actual output-power value of the auxiliary charger and actual output-power value of the main charger, to a battery of the vehicle.

2. The charging apparatus according to claim 1, wherein the first communication control unit of the main charger or the second communication control unit of the auxiliary charger sets the output-power command value for the main charger or the auxiliary charger without exceeding the rated power value of the main charger or a rated power value of the auxiliary charger.

3. The charging apparatus according to claim 1, wherein
when the first communication control unit of the main charger has determined that the charger associated therewith is the main charger, the first communication control unit of the main charger sets a smaller of the first output-power command value and the rated power value of the charger as the output-power command value for the main charger, and when the second communication control unit of the auxiliary charger has determined that the charger associated therewith is the auxiliary charger, the second communication control unit of the auxiliary charger sets a smaller of the second output-power command value and the rated power value of the charger as the output-power command value for the auxiliary charger.

4. The charging apparatus according to claim 1, wherein when the first communication control unit of the main charger has determined that the charger associated therewith is the main charger, the first communication control unit of the main charger sets the difference between the first output-power command value and the actual output-power value of the auxiliary charger as the output-power command value for the main charger, and when the second communication control unit of the auxiliary charger has determined that the charger associated therewith is the auxiliary charger, the second communication control unit of the auxiliary charger sets a smaller of the first output-power command value and a rated power value of the auxiliary charger as the output-power command value for the auxiliary charger.

* * * * *